April 1, 1924.

J. A. BURNS 1,488,474

MACHINE FOR MOLDING INSULATORS

Filed Sept. 24, 1920

J. A. BURNS 1,488,474

MACHINE FOR MOLDING INSULATORS

Filed Sept. 24, 1920 5 Sheets-Sheet 5

WITNESSES:
J. B. Merrill

INVENTOR
James A. Burns
BY
Wesley G. Carr
ATTORNEY

Patented Apr. 1, 1924.

1,488,474

UNITED STATES PATENT OFFICE.

JAMES A. BURNS, OF PITTSBURGH, PENNSYLVANIA, ASSIGNOR TO WESTINGHOUSE ELECTRIC & MANUFACTURING COMPANY, A CORPORATION OF PENNSYLVANIA.

MACHINE FOR MOLDING INSULATORS.

Application filed September 24, 1920. Serial No. 412,478.

*To all whom it may concern:*

Be it known that I, JAMES A. BURNS, a citizen of the United States, and a resident of Pittsburgh, in the county of Allegheny and State of Pennsylvania, have invented a new and useful Improvement in Machines for Molding Insulators, of which the following is a specification.

My invention relates to presses and more particularly to presses of the type designed to form insulators from plastic material and it has, for its primary object, to provide means whereby molds containing the plastic material may be intermittently and successively positioned beneath a vertical reciprocating and rotating forming tool or plunger and be accurately centered thereunder.

Another object is to provide means for conveying molds and formed insulators from beneath the forming tool and delivering them to a station from which they may be conveniently removed.

Another object is to provide means for automatically loosening a mold from the carrier and partially ejecting it from the same after the mold and its plastic contents have been subjected to pressure by the forming tool.

A further object is to provide means whereby the vertical movement of the forming tool will cause and control movement of the carrier and the ejecting means in timed relation therewith.

With such objects in view, as well as other advantages which may be incident to the utilization of the improvement, the invention consists in the parts and combinations thereof hereinafter set forth and claimed, with the understanding that the several necessary elements constituting the same may be varied in proportion and arrangement without departing from the nature and objects of the invention.

In order to make the invention more clearly understood, means are shown in the accompanying drawings for carrying the same into practical effect, without limiting the improvements, in their useful applications, to the particular constructions which, for the purpose of explanation, are made the subject of illustration.

Figure 1:
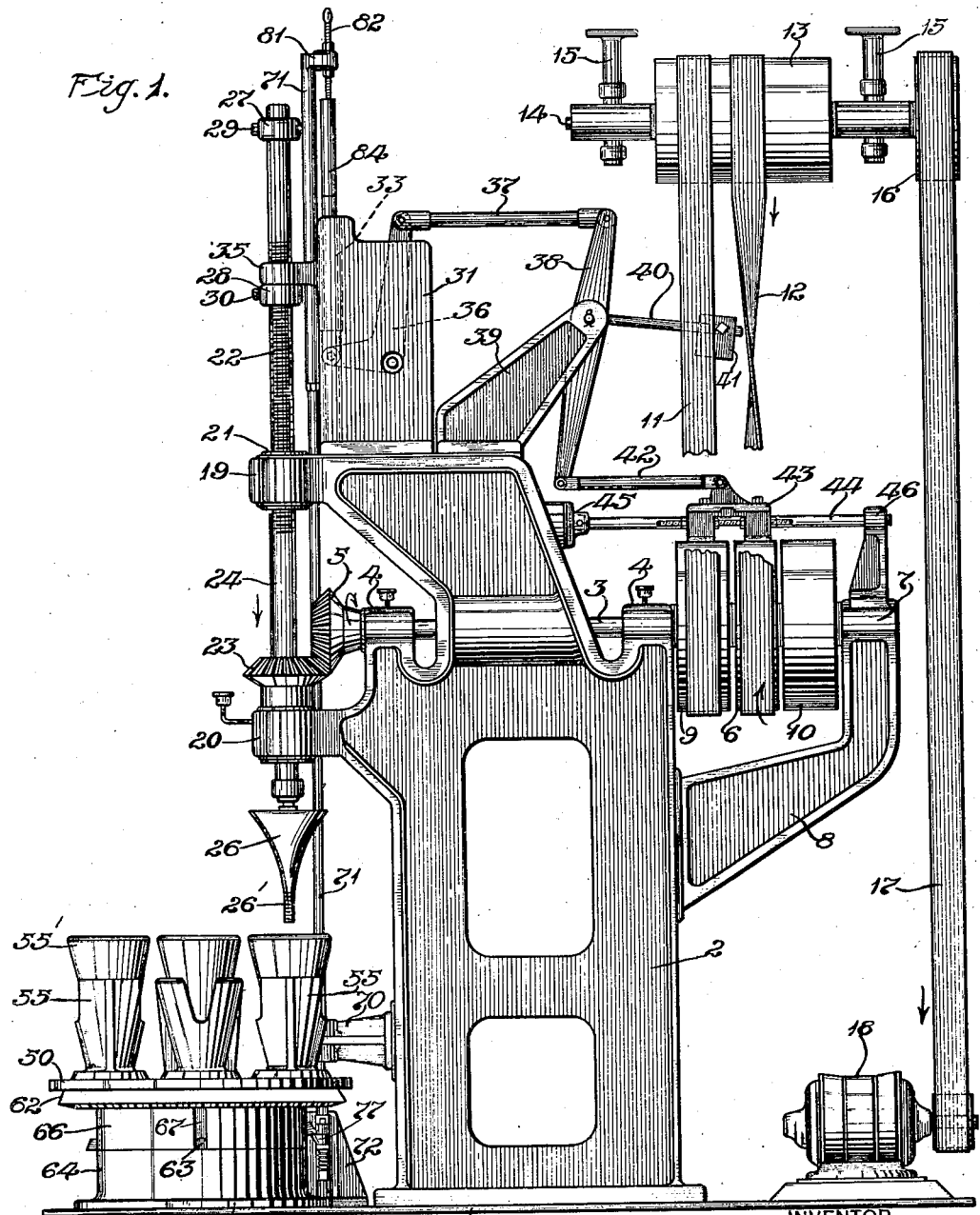
Fig. 1 is a side elevational view of a machine embodying my invention, showing the parts in position, with the plunger or forming tool raised and at the commencement of its downward stroke.

The following is a description of the drawings and of the preferred construction illustrated therein and the preferred mode of operating the same:

Mounted upon a base plate 1 is a main frame structure 2, of suitable construction, which carries a main horizontally disposed power shaft 3 journaled in bearings 4. The shaft 3 has a beveled pinion 5 keyed to its forward end and a driving pulley 6 fixed thereto near its rear end. The rear extremity of the shaft 3 is journaled in a bearing 7 mounted upon an outwardly and upwardly extending bracket member 8 which is secured to the main frame 2.

Rotatably mounted upon the shaft 3 on each side of the drive pulley 6 and adjacent thereto, are idler pulleys 9 and 10 which are adapted to be alternately utilized with the drive pulley 6 in carrying open and closed belts 11 and 12, respectively. The belts 11 and 12 are also disposed around a common pulley 13 which is mounted on a shaft 14 suspended by bracket members 15 from a ceiling or other overhead frame structure. A pulley 16 is keyed to one end of the shaft 14 and is driven by means of a belt 17, which extends downwardly to a suitable source of power, such as a motor 18.

The frame 2 is formed, at its forward end, with upper and lower extensions 19 and 20, the former of which has a nut 21 fixed therein into which is screwed a vertically reciprocating threaded tool shaft 22. The shaft 22 extends downwardly through a beveled pinion 23 which is rotatably mounted in the extension 20 and is keyed to said shaft to permit the vertical movement of the same by means of a feather key 24 coacting with a keyway 25 in said shaft. It will be apparent that, when the pinion 23 is rotated, the shaft will be revolved, causing it to move vertically within the stationary nut 21 and to slide within the pinion 23.

The lower extremity of the shaft 22 has a forming tool 26 of any preferred shape and dimensions, detachably secured thereto, the tool being shown, however, as having a screw threaded lower extremity 26' adapted to co-operate with a mold, as will be hereinafter set forth. The shaft 22 is provided also adjacent to its upper end, with upper and lower collars 27 and 28, adjustably mounted thereon and held in position by means of set screws 29 and 30.

In order that the shaft 22 may be alternately rotated in opposite directions to effect the vertical reciprocation thereof, the following described belt shifting mechanism is provided:

Suitably secured to the upper portion of the frame 2 and at the forward parts thereof is a guide frame 31 which is provided with interior channels or grooves 32 within which a shoe member 33 is slidably mounted for vertical movement, said member having ribs 34 which coact with said grooves to maintain the same against displacement. The shoe member 33 is provided with an extension 35, in the form of an eye in axial alignment with the extensions 19 and 20, which slidably engages the shaft 22 at a point between the collars 27 and 28 and within the path of the same. Pivotally mounted within the guide frame 31 is a bell crank 36, one arm of which extends forwardly and is pivotally connected to the shoe 33, and the other arm of which extends upwardly to a point slightly above the frame 31 and is connected to one end of a link 37 which, in turn, is connected to one end of a rocker arm 38. The rocker arm is mounted upon a bracket 39 fixed to the upper portion of the main frame adjacent the frame 31 and is provided with an arm 40 which extends rearwardly and substantially horizontally and has a counterweight 41 adjustably secured thereto which tends to counterbalance the weight of the shoe 33, through the medium of the stated connections. The lower arm of the rocker arm 38 is connected, by means of a link 42, to a double belt shifter 43, of suitable construction, which is slidably mounted upon substantially parallel stationary rods 44. The rods 44 are supported, at their forward ends, by brackets 45 secured to the main frame 2 and are supported at their rear ends by bracket members 46 fixed to the shaft-supporting bracket 8.

Figure 2:
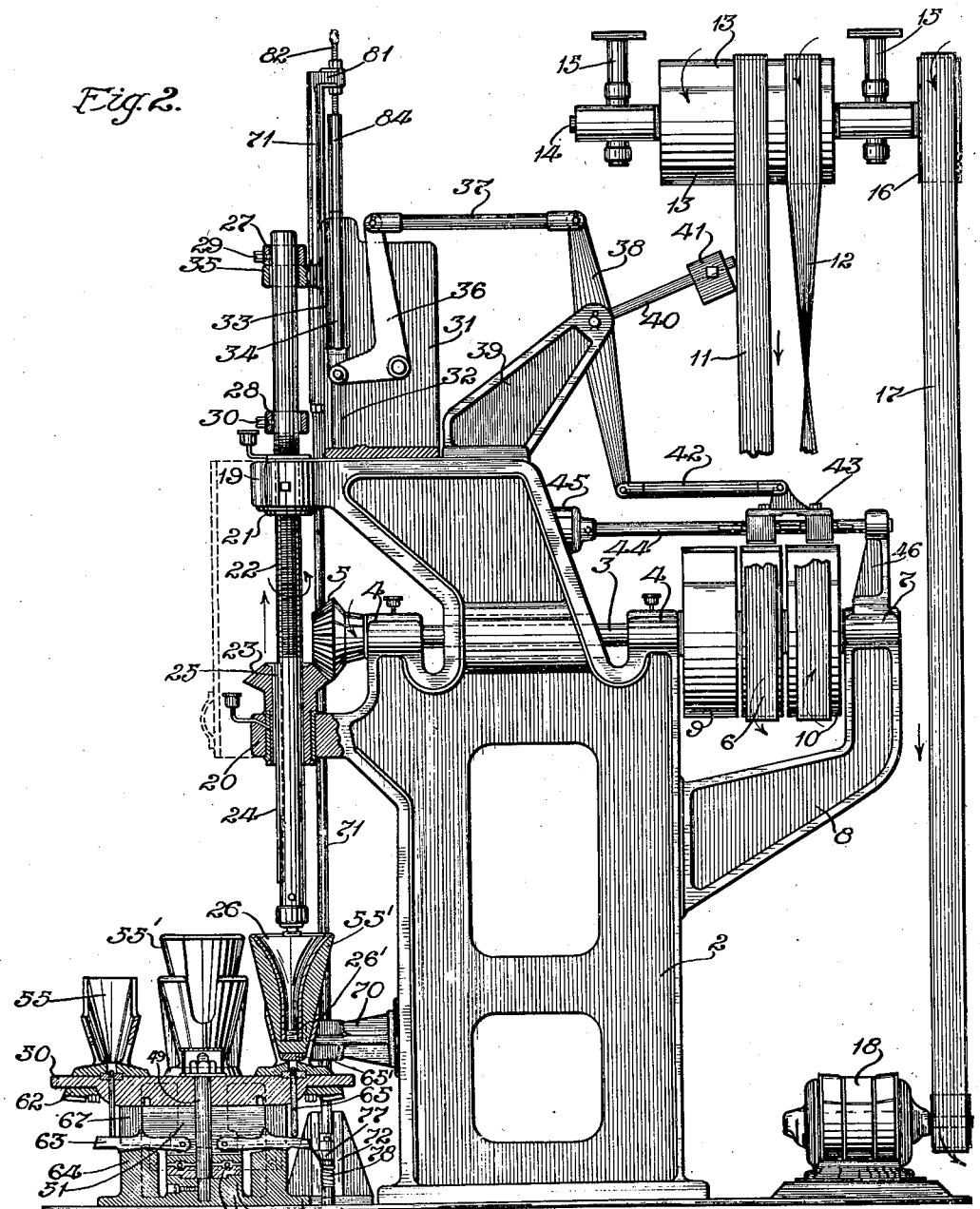
Fig. 2 is a vertical longitudinal sectional view of the machine taken along a line II—II of Fig. 4, showing the parts after the completion of the downward stroke.
Figure 3:
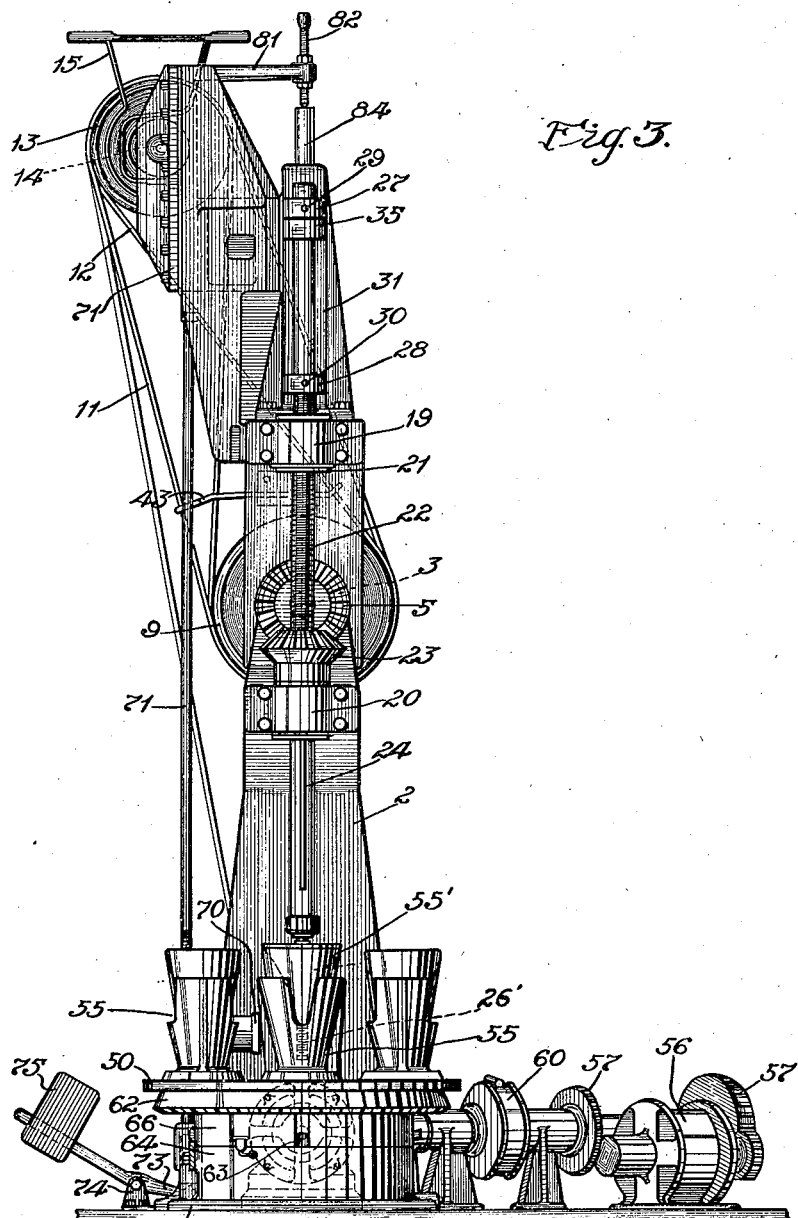
Fig. 3 is a front elevational view, with the parts in the position illustrated in Fig. 2.
Figure 4:
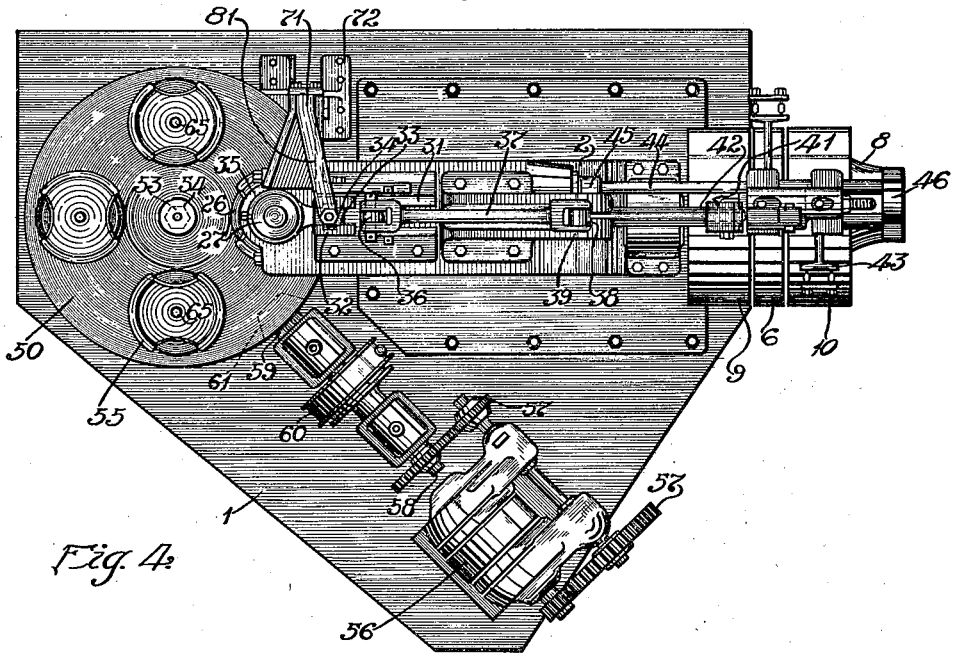
Fig. 4 is a plan view of the entire machine.

By reason of this arrangement, when power is applied to the main drive shaft 3, through the various pulleys, to screw the shaft 22 in a downward direction, the upper collar 27 will engage the eye 35, at a predetermined point, and force the shoe or slide 33 downwardly, thereby swinging the bell crank 36 upon its pivot in a counter-clockwise direction, as shown in Figs. 1 and 2, causing the rocker arm to move about its pivot against the action of the weight 41. The belt shifter 43 will thus be forced rearwardly, thereby transferring the closed belt 12 from the drive pulley 6 to the idler pulley 10 and the open belt 11 from the idler pulley 9 to the drive pulley 6. The parts are then in position for the upward movement of the shaft 22, as illustrated in Fig. 2 of the drawings. The shaft 3 will then rotate in the direction of the arrows in Fig. 2 and cause the vertical shaft 22 and the forming tool 26 to move upwardly out of engagement with the mold until the lower collar 28, carried thereby, engages the eye 35 and lifts the slide 33, assisted by the weight 41, thereby causing the belt shifter, through the medium of its associated mechanisms, to again so transfer the belts as to cause a reverse movement of the parts, as illustrated in Fig. 2 of the drawings.

In front of the machine, adjacent to the reciprocate forming tool 26, is a base member 47 which is formed with a centrally disposed hub 48 (Figs. 2 and 6) having a vertically extending stud shaft or pin 49 fixed therein. Rotatably mounted upon the base member 47 and about the pin 49 is a mold-supporting and carrying table or turret 50 also formed with a hub 51 which engages, and is supported by, the hub 48 of the base member and an interposed anti-friction step bearing 52, of suitable construction. The turret 50 is maintained in position on the pin 49 by means of a nut 53, and dirt or other foreign matter is excluded from the bearing elements by means of a dust cap 54. The turret 50 has secured thereto, in any preferred manner and near the periphery thereof, a plurality of mold holders 55, illustrated as comprising four cup-shaped members equally spaced apart and so arranged as to pass directly beneath the forming tool 26 and are adapted to receive and successively convey molds 55' and their plastic contents to and from the forming station.

The turret is rotated by means of the following described mechanism: A motor 56 is preferably located slightly at one side of the main frame 2 of the machine and it drives, through the medium of suitable reduction gears 57, a shaft 58 which, in turn, drives a shaft 59 by means of a suitable friction slip connection 60. The shaft 59 has a beveled pinion 61 keyed thereto at its forward end, which meshes with and drives a beveled-ring gear 62 secured to the underside of the turret 50.

In order that the rotation of the turret may be so controlled as to result in an intermittent movement thereof, which is timed with respect to the reciprocations of the forming tool and to insure a proper centering of the mold holders under the same at the forming station, the following mechanism is provided.

Pivotally mounted for vertical movement upon the hub 51 of the turret 50 and in line with the mold holders 55 is a plurality of latch members 63, corresponding in number to the said holders, which normally rest upon, and are supported by, the upper edge of an upwardly projecting concentric flange or track 64, which is or may be integral with the base member 47. The outer ends of the latches 63 support and actuate, at periodic intervals, vertically movable knock-out pins 65, which extend through apertures in the turret 50 and project into each of the mold holders 55. Suitable shock-absorbing pads or bumpers 65' are interposed between the pins 65 and the bottom of the molds 55' to prevent injury thereto by distributing the shock delivered by the knock-out pin throughout the bottom of the mold. An annular member 66, similar in form to the flange 64, extends down from the turret 50 to a plane contiguous with the upper surfaces of the track 64 and serves to act as a side bearing to maintain the turret in a horizontal position, in the event of an overbalanced load. The flange 66 is provided with vertical slots 67 through which the latches 63 project preventing any tendency for lateral movement of the latches when they engage the stop mechanism.

Figure 7:
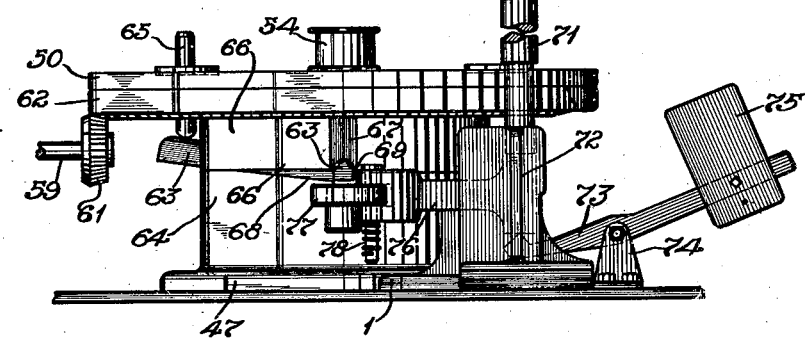
Fig. 7 is a rear elevation of the parts illustrated in Figs. 4 and 5.

The track 64 is provided with a downwardly extending inclined portion 68 (Fig. 7) which terminates in a vertical stop or shoulder 69 directly under the forming station. As the turret 50 revolves, the latches 63, riding upon the track 64, successively arrive at, and move down, the incline 68, under the action of gravity, until they come in contact with, or abut, the shoulder 69 and temporarily interrupt the rotation of the turret 50 by interposing themselves between the shoulder 69 and the edge of their slots 67, thus positively locking the turret and the elements carried thereby to the base and preventing any possible accidental movement thereof during the moulding operation. The motor 56, however, continues to run, owing to the interposed frictional drive connection therebetween. At this moment in the operation of the parts, the reciprocating shaft 22 is at the height of its upward stroke and at the beginning of its downward travel. (Fig. 1.)

Figure 5:
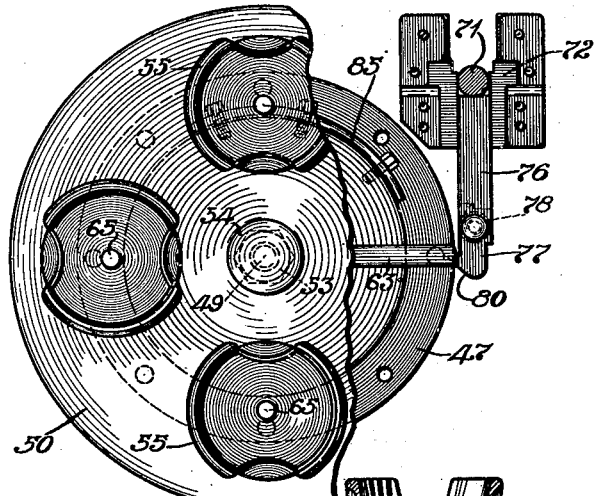
Fig. 5 is a detail plan view, on a larger scale, of a rotatable mold carrier or turret, a portion being broken away to illustrate the mold-ejecting mechanism.
Figure 6:
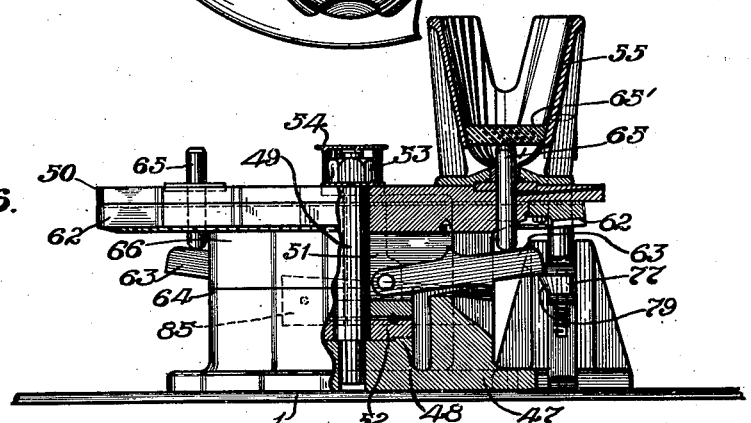
Fig. 6 is a side view of the mechanism shown in Fig. 5, partly in elevation and partly in section, showing the carrier-control and mold-ejecting devices.

In order that the latches 63 may be effectively disengaged from the shoulder 69 at the proper predetermined moment to release the turret and permit the same to turn a quarter of a revolution to deliver a mold and its formed article from the forming station, and, at the same time, to convey another mold and its unformed plastic contents to said station, the following mechanism is provided:

Mounted in suitable guide bearings 70 and parallel to the reciprocating shaft 22 is a vertically extending rod 71 having its lower end slidably stepped in a bearing 72 secured to the base plate 1. The lower end of the rod 71 is supported by one end of a lever 73 pivotally mounted on a bracket 74. The outer arm of the lever 73 has a counterweight 75 adjustably secured thereto, which tends, at all times, to overcome the weight of the rod and to lift the same. The lower end of the rod is provided with an extension 76 of L shape which has a latch-engaging member 77 pivoted thereto for horizontal rearward movement and is normally maintained in alignment with the extension 76 by a coil spring 78. The member 77 has its latch-engaging portion provided with beveled faces 79 and 80. (Figs. 5 and 6.) The beveled face 79 is designed to engage the upper edge of the latch 63 and to be forced backwards against the action of the spring 78 and to then snap under the latch in case the same has engaged the shoulder 69 and fallen into place before the rod 71 and the extension 76 have completed their downward stroke, thus avoiding any chance of breaking the extension 77. The beveled face 80 of the member 77 is designed for the same general purposes but is adapted to be engaged by the end of the latch 63 in the event that the extension 76 completes its downward stroke before the latch has fallen into place. The upper end of the rod 71 is provided with a horizontal extension 81 which projects to a point directly in line with the shoe 33 and is provided with a set screw 82 to engage a pedestal 84 that is suitably secured to, and projects from, the shoe 33.

By reason of this arrangement of parts, as soon as the reciprocating shaft 22 completes its upward stroke and the tool 26 is entirely clear of the mold and the collar 28 engages the eye 35 and commences to lift the shoe 33 for the purpose of shifting the belts to effect a reversal of the movements, the pedestal 84 will commence to lift the rod 71 by means of the extension 81. Vertical movement of the rod 71 is assisted, as previously set forth, by the action of the weight 75, and the extension 76 lifts the latch 63 clear of the shoulder 69, thereby permitting the table to move another quarter of a revolution and, at the same time, causing the vertical movement of the knockout pin 65 to loosen the mold which may have become jammed by the pressure of the forming operation.

As the turret 50 revolves, upon being thus released, the latch 63 engages a cam 85 in the form of an arcuate plate secured to the edge of the track 64 and is moved upwardly, thus causing the knock-out plunger 65 to partially so eject the mold from its holder that, by the time it reaches the station from which it is removed from the machine, it is entirely loosened and partially lifted from the holder. Continued movement of the table carries the latch over the cam and it drops back upon the track 64, allowing the knock-out pin 65 to recede from the holder and making room for another mold to be placed therein.

Considering the machine with the parts in the position illustrated in Fig. 1 of the drawings and assuming that a mold, containing a predetermined quantity of plastic material of the desired composition and consistency has been placed in a mold holder and been carried around to a position under the forming tool 26, the operation of the machine is as follows:

The relatively rapid rotation imparted to the tool shaft 22 and the tool 26, by means of the beveled pinions 5 and 23, and the directly associated driving mechanism, causes it to be screwed downwardly through the stationary nut 21 into the mould 55', thereby imparting to the contents thereof an interior configuration corresponding to the exterior shape of the forming tool and compressing the same within and against the walls of the mold. When the shaft and tool have descended the desired distance into the mold, the upper collar 27 engages the eye 35 and causes the depression of the slide 33, thereby so actuating the belt-shifting mechanism as to transfer the closed belt 12 from the drive pulley 6 to the idler pulley 10 and the open belt 11 from the idler pulley 9 to the drive pulley 6.

During the above-set-forth movements, and simultaneously therewith, the pedestal 84 of the shoe 33 lowers the rod 71, the weight of which is just sufficient to overcome the action of the weight 75. The hinged extremity 77 of the extension 76 at the lower end of the rod 71 engages the end of the latch 63 and is forced rearwardly by means of the beveled surface 79 thereof and snaps under the latch 63. The parts of the machine are now in the position illustrated in Fig. 2 of the drawings. The transfer of the belts having been completed by this time, a reversal of operation commences. The rotation of the shaft 3 and the pinion 5 being reversed, the shaft 22 is rotated in the opposite direction, causing it to screw upwards through the nut 21, thereby unscrewing the forming tool from the formed article and elevating it clear of the mold. As the lower collar 28 of the shaft 22 rises, it engages the eye 35 of the shoe 33 and lifts the same, causing the pedestal 84 to lift the rod 71, assisted by the weight 75, and elevates the extension 76 sufficiently to lift the latch 63 out of engagement with the stop 69, thereby releasing the turret 50 and causing the latch to raise the knock-out plunger 65 and to loosen the mold within the holder. The motor 56 has been running through the medium of the friction drive connection 60 the entire time the turret 50 was held stationary. The motor now causes the turret 50 to rotate another quarter of a revolution, or until another latch member 63 again arrests its movement and carries the mold and the formed article from under the tool 26. As the carrier 50 thus rotates, the latch 63 comes in contact with the cam 85 which further raises the plunger and partially ejects the mold from its holder.

By this time, the shaft 22 has again reached the limit of its upward movement and has so shifted the belts that the cycle of movements is repeated.

I claim as my invention:

1. A molding machine having, in combination, a rotary, reciprocating forming tool, a rotatable mold carrier co-operating therewith, a plurality of mold holders carried thereby, a latch member pivotally mounted on said carrier adjacent each mold holder for arresting the movement of said carrier at predetermined intervals, means including a latch-engaging member for releasing said latches in timed relation with the reciprocations of said tool, and means for actuating said forming tool and carrier.

2. A molding machine having, in combination, a frame, a nut fixed in said frame, a screw threaded shaft mounted in said nut, means for rotating said shaft thereby causing the same to move relatively to said nut, a forming tool detachably secured to said shaft, a mold carrier disposed in the path of said tool and means for causing the intermittent movement of said carrier in timed relation with the movement of said tool.

3. A molding machine having, in combination, a movable shaft, a forming tool carried thereby, a mold carrier in the path of said tool, a latch mechanism carried by said carrier, a stop in the path of said latch mechanism, latch releasing mechanism adjacent thereto and actuated by said shaft.

4. A molding machine having, in combination, a movable shaft, a forming tool carried thereby, a mold carrier in the path of said tool, stop mechanism carried by said mold carrier, mold disengaging means actuated by said stop mechanism, and means for actuating said stop mechanism.

5. A molding machine having, in combination, a forming tool, a mold carrier in the path of said tool, mold holders mounted on said carrier and adapted to receive molds containing the plastic material to be formed and conveying same to the forming station, latch members carried by said mold carrier, a stop in the path of said latch members, means actuated by said latch members for disengaging said molds from said holders, and means for disengaging said latch members from said stop and for actuating said mold disengaging means.

6. A molding machine having, in combination, a forming tool, a mold carrier in the path of said tool, a mold holder mounted thereon, stop mechanism carried by said mold carrier, mold engaging plungers actuated by said stop mechanism and means for actuating said stop mechanism.

7. A molding machine having, in combination, a forming tool, a mold carrier in the path of said tool, mold holders mounted on said carrier, latch members carried by said mold carrier, a stop in the path of said latch members, mold engaging knock-out plungers actuated by said latch members and means whereby the movement of said tool disengages said latch members from said stop and simultaneously actuates said plungers.

8. A molding machine having, in combination, a forming tool, a mold carrier in the path of said tool, mold holders mounted on said carrier, a plurality of latch members pivoted to said carrier and beneath said holders, mold engaging plungers operatively supported by said latch members and extending within said holders, a stop in the path of said latch members adapted to be successively engaged by said latch members, and tool controlled means for successively disengaging said latch members from said stop and simultaneously actuating said plungers.

9. A molding machine, having, in combination, a forming tool, a mold carrier in the path of said tool, mold holders mounted thereon, a track adjacent said carrier, latch members carried by said mold and adapted to ride upon said track, a stop in the path of said latch members adapted to be successively engaged by said latch members, and means for disengaging said latch members from said stop.

10. A molding machine having, in combination, a forming tool, a mold carrier in the path of said tool, mold holders mounted on said carrier, stop devices carried by said carrier and adjacent said mold holders, mold disengaging means adapted to be actuated by said stop devices, and a cam in the path of said stop devices adapted to cause the same to actuate said mold disengaging means.

11. A molding machine having, in combination, a movable forming tool, a mold carrier in the path of said tool and having mold holders mounted thereon, latch members carried by said mold carriers, a latch supporting track upon which said latch members are adapted to ride, a stop on said track adapted to be successively engaged by said latch members, mold engaging means supported and actuated by said latch members, tool controlled means for disengaging said latch members from said stop, and a cam in the path of said latch members to actuate the same to cause the mold engaging means to partly eject said molds from said holders.

In testimony whereof, I have hereunto subscribed my name this 22nd day of September, 1920.

JAMES A. BURNS.